United States Patent [19]

Cantwell et al.

[11] Patent Number: 5,689,535
[45] Date of Patent: Nov. 18, 1997

[54] METHOD AND APPARATUS FOR PROCESSING MULTIPLE FACILITY DATALINKS

[75] Inventors: Robert W. Cantwell, Garland; Steven D. Sensel, The Colony, both of Tex.

[73] Assignee: DSC Communications Corporation, Plano, Tex.

[21] Appl. No.: 341,291

[22] Filed: Nov. 15, 1994

Related U.S. Application Data

[63] Continuation of Ser. No. 934,922, Aug. 25, 1992, abandoned.

[51] Int. Cl.[6] .................................................. G06F 11/10
[52] U.S. Cl. .................... 375/364; 340/825.15; 370/537; 370/538
[58] Field of Search .......................... 370/13, 464, 537, 370/538, 540; 375/354, 365; 340/825.15

[56] References Cited

U.S. PATENT DOCUMENTS

| | | | |
|---|---|---|---|
| 4,181,909 | 1/1980 | Pyeatte et al. | 375/107 |
| 4,347,620 | 8/1982 | Black et al. | 375/112 |
| 4,567,595 | 1/1986 | Hedlund | 370/13 |
| 4,589,108 | 5/1986 | Billy | 370/112 |
| 4,688,215 | 8/1987 | Fryer | 375/112 |
| 4,696,051 | 9/1987 | Breeden | 375/107 |
| 4,797,951 | 1/1989 | Duxbury et al. | 375/38 |
| 4,993,026 | 2/1991 | Yamashita | 370/100.1 |
| 5,081,619 | 1/1992 | Nagata | 370/13 |
| 5,189,410 | 2/1993 | Kosugi et al. | 340/825.14 |
| 5,228,030 | 7/1993 | Dresher | 370/100.1 |
| 5,241,541 | 8/1993 | Farrell et al. | 370/100.1 |
| 5,319,637 | 6/1994 | Taniguchi et al. | 370/112 |

*Primary Examiner*—Wellington Chin
*Assistant Examiner*—Jean B. Corrielus
*Attorney, Agent, or Firm*—Baker & Botts, L.L.P.

[57] ABSTRACT

A method and apparatus for processing a plurality of facility datalinks is provided. In particular, synchronizers (14 and 16) receive multiple facility datalinks and synchronize them. These synchronized signals are transmitted to FDL state machine (18). FDL state machine (18) separately stores each of the facility datalinks in a memory (20). A processor (22) accesses the facility datalinks stored within memory (20) and initiates responses based on the accessed facility datalinks.

18 Claims, 3 Drawing Sheets

METHOD AND APPARATUS FOR PROCESSING MULTIPLE FACILITY DATALINKS

This application is a continuation of application Ser. No. 07/934,922 filed Aug. 25, 1992, entitled "Method and Apparatus for Processing Multiple Facility Datalinks" by Robert W. Cantwell and Steven D. Sensel, now abandoned.

TECHNICAL FIELD OF THE INVENTION

This invention relates generally to the field of data communications systems, and more particularly to a method and apparatus for processing multiple facility datalinks.

BACKGROUND OF THE INVENTION

Digital datalinks have become a preferred means for transmitting information throughout a telecommunications network. A standard method of monitoring the performance of such digital datalinks has been developed and is specified in ANSI T1.403. That document describes the format of a performance monitoring datalink embedded in the telecommunications data. This performance monitoring datalink is known as a facility datalink ("FDL"), and each FDL is embedded in each DS1 datalink, wherein each DS1 datalink comprises 24 voice channels.

Present systems that make use of this FDL employ separate transmitters and receivers for each FDL. Moreover, one such transmitter or receiver typically occupies one entire integrated circuit. Consequently, in systems that use multiple DS1s, and therefore use multiple FDLs, significant space and cost are involved in monitoring the performance of such DS1 digital datalinks.

Therefore, a need has arisen for a single system that is capable of processing multiple FDLs.

SUMMARY OF THE INVENTION

In accordance with the present invention, a method and apparatus for processing multiple facility datalinks is provided which substantially eliminates or reduces disadvantages and problems associated with prior art systems. In particular, a circuit and method is provided for processing a plurality of facility datalinks received from a telecommunications network, wherein each of the facility datalinks has a plurality of bits. A synchronizer synchronizes the facility datalinks and transmits them to a facility datalink state machine. The facility datalink state machine receives the facility datalinks and separately stores each of the facility datalinks in a memory.

An important technical advantage of the present invention is the fact that multiple facility datalinks can be received and processed in a single system, thus eliminating the need for multiple receivers and processors for single or very few facility datalinks.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
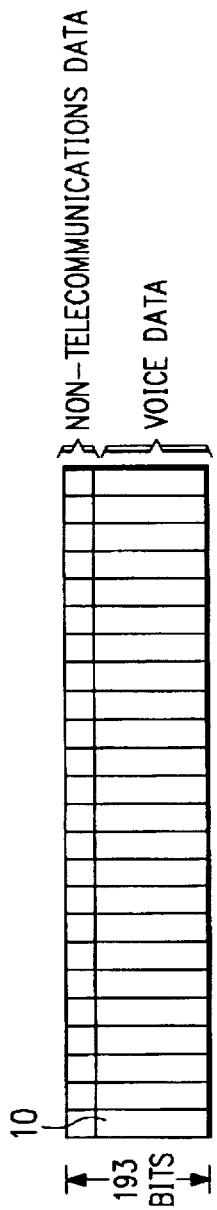
FIG. 1 illustrates the data format for a DS1 datalink.

FIG. 1 illustrates the format for telecommunications data sent in a DS1 digital datalink. The format of the data shown in FIG. 1 is the extended superframe format of ANSI T1.403. In this extended superframe format, 24 frames (with a typical frame indicated by Reference 10) are provided. Each of these frames contains 193 bits of data, with 192 of the bits dedicated to telecommunications data, such as voice data. The remaining bit is used for framing information. In the extended superframe format, it also includes cyclical redundancy checks and the FDL. As described in the background of the invention, the FDL is data for monitoring the performance of a DS1 digital datalink.

As specified in the ANSI T1.403 standard, the twenty-four non-telecommunications data bits of an extended superframe comprise six framing bits which provide information on where each superframe begins and ends; six cyclical redundancy check bits; and twelve FDL bits. The twelve facility datalink bits make up every other bit of these twenty-four bits in the extended superframe format.

It should be recognized that although the present invention will be described in relation to the extended superframe format of the ANSI T1.403 standard, the present invention applies as well to other performance monitoring datalinks, since the present invention relates to a system for processing multiple performance datalinks in a single system and is not strictly dependent upon the format of the FDL.

For the extended superframe format of data shown in FIG. 1, 8,000 frames are typically transmitted per second, resulting in a bit rate of 1.544 megahertz. Therefore, all of the data in the extended superframe is sent in 3 milliseconds. Since every other framing bit is an FDL bit, the bit rate for a single FDL is 4 KHz.

Figure 2:
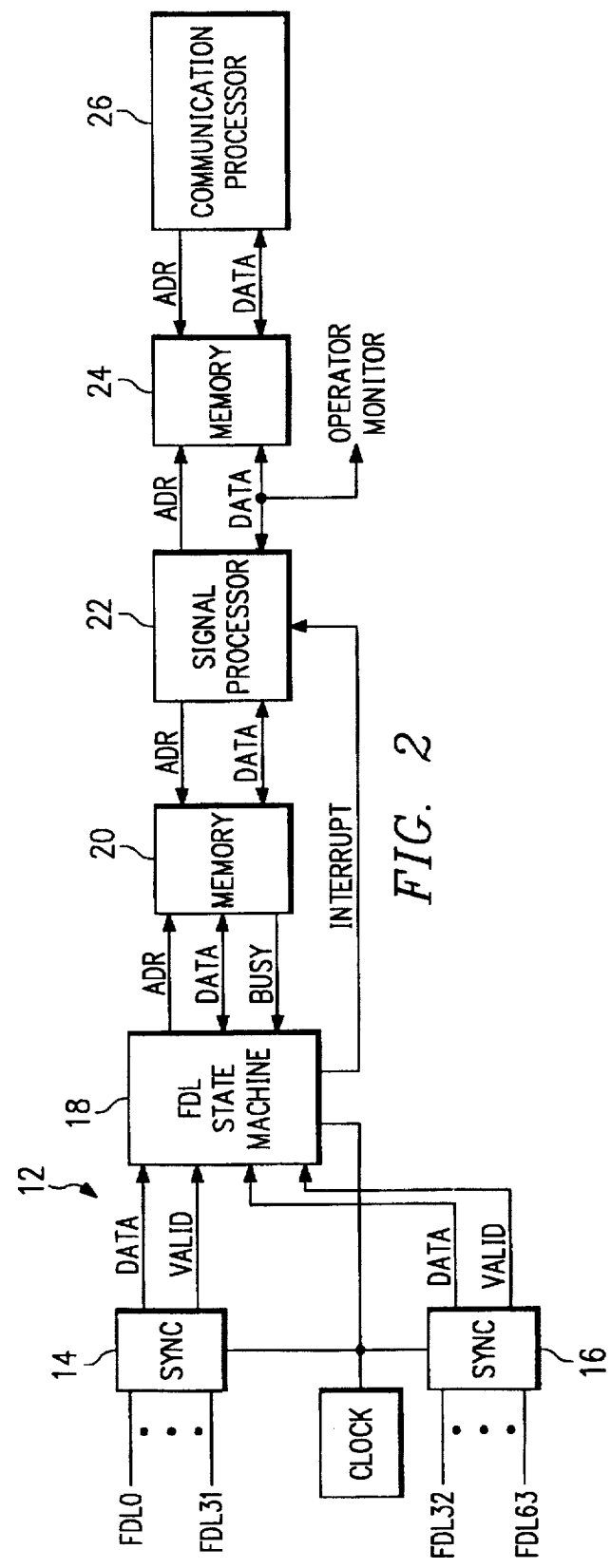
FIG. 2 is a block diagram of a multiple FDL receiver constructed according to the teachings of the present invention.

FIG. 2 illustrates a block diagram of a multiple FDL processor 12 constructed according to the teachings of the present invention. Signal FDL 0 through FDL 63 represent 64 distinct FDLs, each one associated with a DS1 datalink. For purposes of teaching the present invention, 64 FDLs are illustrated, although it should be recognized that more or less than 64 FDLs may be used without departing from the intended scope of the invention. Synchronizers 14 and 16 operate to receive 32 FDL inputs each and synchronize them, for example, to a total bit rate of 288 KHz. Synchronizers 14 and 16 each multiplex 32 parallel FDLs into a single data stream.

Because the data rate of each FDL is 4 KHz, the total bit rate received by synchronizers 14 and 16 is approximately 256 KHz. However, due to the fact that the FDLs are not synchronized with each other (since each corresponds to separate DS1 links) a synchronization rate of higher than 256 KHz must be used to ensure that all incoming bits are received. In one embodiment, the bits are synchronized to a rate of 288 KHz. Because the average incoming rate, as discussed above, is approximately 256 KHz, approximately one "stuff" bit must be inserted into the output data stream for every eight incoming bits to achieve a synchronization rate of 288 KHz.

For the data rates of 256 and 288 KHz discussed above, synchronizers 14 and 16 sample each FDL input at approximately four times the rate of each individual FDL input. As shown in FIG. 2, a data valid signal is generated each time a valid data bit is received and multiplexed. Thus, synchronizers 14 and 16 "stuff" a 0 into the multiplexed data stream if the data valid signal for a given FDL is not valid at the time that FDL is to be multiplexed into the output data stream.

FDL state machine 18 receives the data output by synchronizers 14 and 16. FDL state machine 18 operates to direct and organize the multiple FDLs synchronized by synchronizers 14 and 16. The operation of FDL state machine 18 will be described below in connection with the flow diagram illustrated in FIG. 4. If the data valid signals output by synchronizers 14 and 16 indicate that the data on the output data lines of synchronizers 14 and 16 are invalid, then FDL state machine 18 disregards and does not receive that data.

Figure 3:
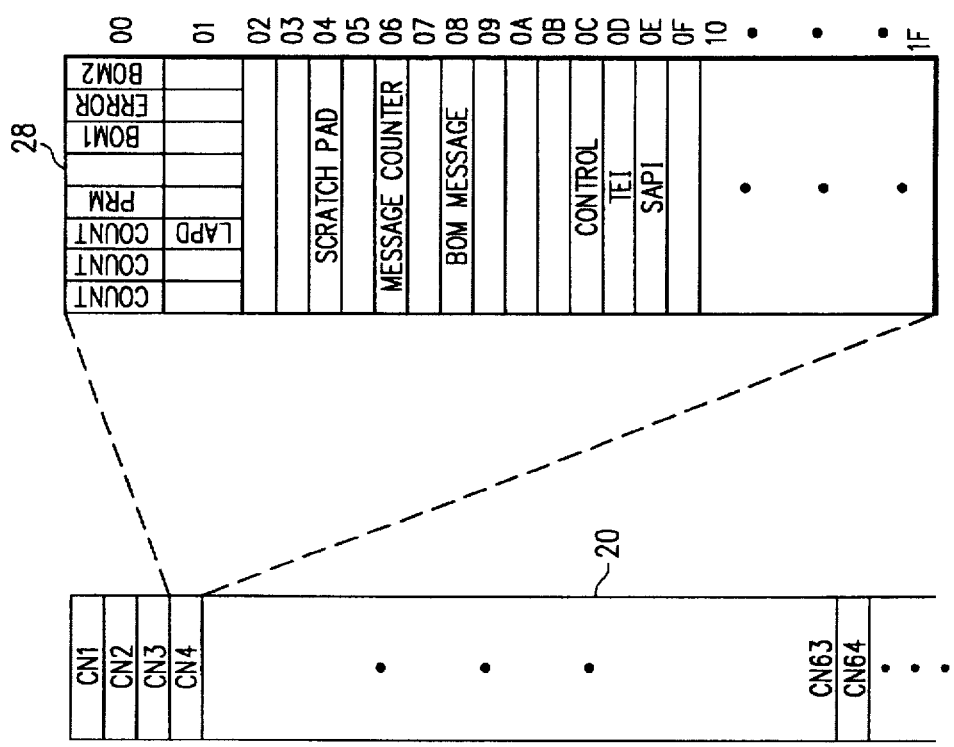
FIG. 3 is a memory map used by a multiple FDL state machine constructed according to the teachings of the present invention.

As shown in FIG. 2, FDL state machine 18 is coupled to a memory 20. Memory 20 may be separate from or integral with FDL state machine 18. Memory 20 is used by FDL state machine 18 to store the multiple FDLs and to store control information for its operation. One embodiment of a memory map of memory 20 is shown in FIG. 3 and will be discussed below. A processor 22 accesses memory 20 to evaluate the substance of the messages received in the multiple FDL signal lines. Processor 22 also accesses and uses a memory 24 in connection with its evaluation of the FDL messages stored in memory 20. Stored within memory 24 are instructions for controlling processor 22 and data storage area for storing data processed and output by processor 22. For example, processor 22 may execute instructions from memory 24 to determine whether any of the FDL messages stored in memory 20, such as indications of transmission line faults, require further action. Processor 22 then can be used to provide such information to an operator monitor. Furthermore, a communication processor 26 can be used to access memory 24 and notify operators of various conditions, or similar functions such as initiating responses to the messages transmitted in the FDLs.

It should be recognized that memory 20 and memory 24 may comprise the same memory chip or circuit. Likewise, processor 22 and communication processor 26 may be separate circuits or comprise the same processing chip or circuit. Furthermore, memory 20 and 24 may be resident on or be separate from processors 24 and 26.

FIG. 3 represents a memory map of one embodiment of memory 20. Memory 20 is shown in FIG. 3 as containing multiple channels, and in particular, as shown in FIG. 3, channels CN1 through CN64. Each channel represents 32 bytes of information. As an illustration, the 32 bytes of channel 4 are shown generally at memory map 28. As shown at memory map 28, each memory channel of memory 20 contains 32 bytes of information, labeled 00 through 1F, represented in hexadecimal format. Depending on the format of the FDLs, more or less memory than that shown generally at memory map 28 may be used without departing from the intended scope of the present invention. As will be discussed in detail in connection with FIG. 4, memory location 00 through 0F of memory map 28 may be used to store what may be termed control information, and memory locations 10 through 1F may be used to store substantive portions of the FDL messages. As used in memory map 28, memory locations 00 through 1F correspond to memory offset locations based on the beginning memory location of Channel 4.

Figure 4B:
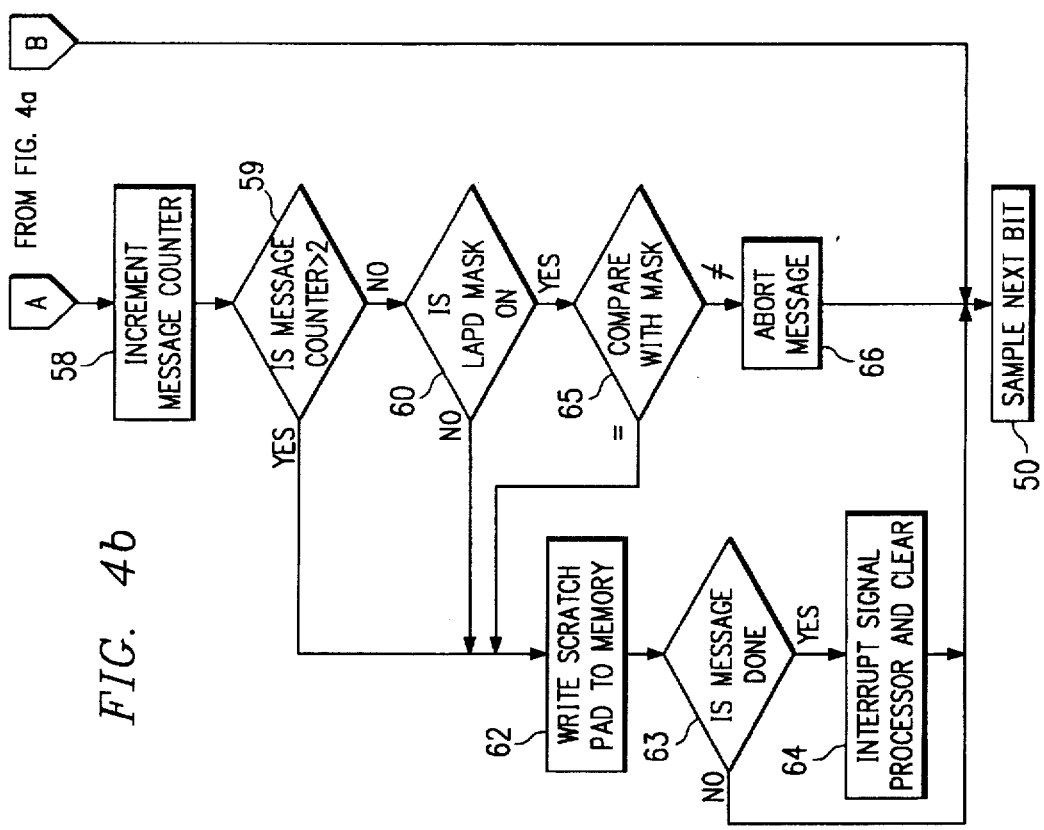
FIGS. 4a and 4b comprise a flow diagram of a multiple FDL state machine constructed according to the teachings of the present invention.
Figure 4A:
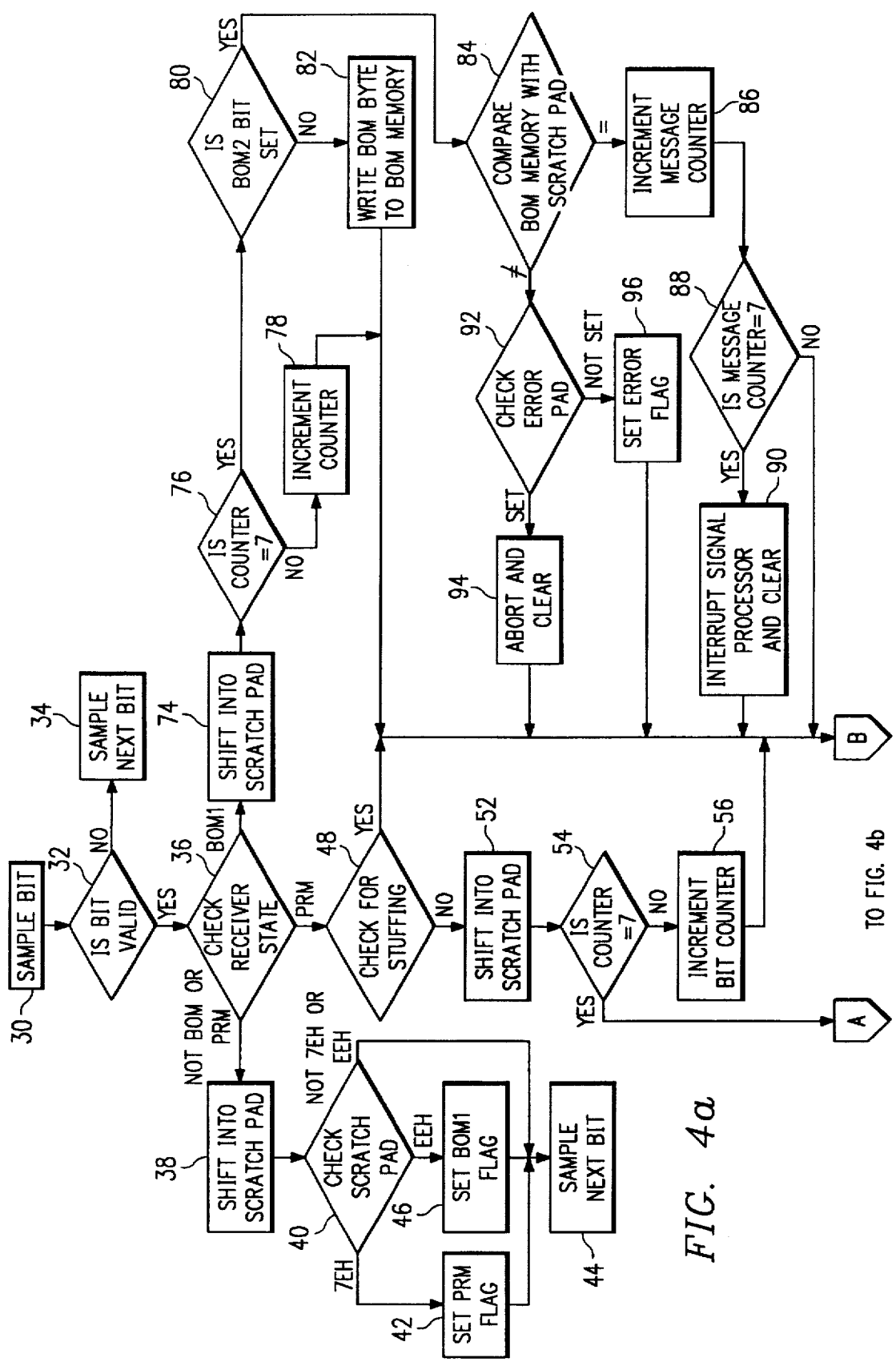

Referring now to FIGS. 4a and 4b, a flow diagram of state machine 18 is illustrated. It should be recognized that the flow diagram of FIGS. 4a and 4b illustrates the operation of FDL state machine 18 for any given FDL. The flow of state machine 18 for any given bit will be based on status of the particular FDL from which that bit was received.

Block 30 indicates the sampling of a bit by FDL state machine 18. State machine 18, at decision block 32, determines whether the bit is valid by reading the data valid signals from synchronizers 14 and 16. If the bit is not valid, then FDL state machine 18 disregards the bit and then samples the next bit received from synchronizers 14 and 16, at block 34. If the sampled bit is valid, state machine 18 evaluates the status of a receiver state register at block 36. A receiver state register exists for each FDL, and is located in the memory set aside for each FDL, as shown in FIG. 3. The receiver state register comprises two flags. One flag indicates that a BOM message is being received, and the other indicates that a PRM (Performance Report Message) message is being received (both types of messages will be discussed below). If neither flag is set, then no BOM or PRM message is being received. In one embodiment, the flags are denoted as PRM and BOM1 in byte 00 of memory map 28 of FIG. 3.

Two types of messages may be sent as part of the T1.403 FDL message format. The first type of message is the PRM type message, and it follows a LAPD format. The second type of message is a BOM message and it follows a specified bit pattern. A PRM message is sent every second, while a BOM message may be sent at any time.

A PRM message contains 15 bytes of information. The first four bytes of information comprise a flag, a SAPI byte, a TEI byte, and a control byte. The next eight bytes comprise the performance report data. The following two bytes are for error detection, followed by a one-byte flag. The flag that initiates and ends a PRM message comprises a 7E hexadecimal number.

BOM messages comprise two bytes. The first byte is a flag byte of FF hexadecimal. Thus, if FF hexadecimal is ever received, the next byte is a BOM message. The format of a BOM message is a 0 followed by a six-bit message, followed by a 0. BOM messages are divided into two types of messages: priority and command/response. Priority BOMs represent an alarm condition and are transmitted continuously until the alarm condition clears, or for a minimum of 1 second. Command/response messages are sent continuously for at least 10 times and are considered validated if received 8 of those 10 times.

If, at block 36 of FIG. 4a, the BOM1 or PRM bits are not set, then the sampled bit is shifted into scratch pad at block 38. A scratch pad exists for each FDL, and is one of the control information bytes shown in memory map 28 of FIG. 3. As shown in FIG. 3, the scratch pad is shown in offset location 4. After the bit has been shifted in the scratch pad, state machine 18 checks the contents of the scratch pad to determine whether a PRM or BOM signal flag has been received. This decision is indicated at block 40. If the PRM flag, 7EH, has been received and is in the scratch pad, then the PRM bit is set at block 42. As shown in FIG. 3, a PRM flag exists for every FDL and is contained in the first byte of memory map 28. Once this PRM flag has been set, the state machine then samples the next bit sent by synchronizer 14 and 16 as shown in block 44. If the BOM flag, EEH, has been received and is in the scratch pad, then state machine 18 sets the BOM1 flag at block 46. The BOM1 flag is represented as BOM1 in the first byte of memory map 28 of FIG. 3. A BOM1 flag exists for every FDL. If after shifting in the bit into the scratch pad in block 38, the scratch pad does not contain the PRM or BOM flag, then state machine 18 cycles to sample the next bit at block 44.

If at block 36 the receiver state register indicates that the PRM bit is set, then state machine 18 cycles through to decision block 48. Under the ANSI T1.403 format, the flag of a PRM message, as discussed above, is a 0 followed by 111111 followed by 0. To prevent data that is sent as part of the substantive portion of the PRM message from duplicating the flag pattern, the ANSI T1.403 standard requires that a 0 be stuffed by the FDL message originator whenever 111111 appears in the message portion of the PRM message. Thus, state machine 18 checks at block 48 for stuffing. If stuffing has occurred, then the 0 is disregarded and state machine 18 cycles through to sample the next bit at block 50. If no stuffing has occurred, then the bit is shifted into the scratch pad at block 52. A bit counter, shown as the three most significant bits of the first byte of memory map 28 in FIG. 3, is checked at decision block 54. This bit counter operates to count the number of bits received for each byte of the PRMmessage. If a complete byte has been received, the counter would equal 7. If a complete byte has not been received, then decision block 54 requires the state machine 18 to increment this bit to nter at block 56 and cycle through to block 50. If the counter is equal to 7, then a complete byte has been received and a message counter is incremented (and the bit counter cleared) at block 58 of FIG. 4b. A message counter exists for each FDL, and is shown at location 06 on memory map 28 of FIG. 3.

Depending on the requirements of the system in which the present invention is to be used, processor 22 shown in FIG. 2 may disregard messages that are not preceded by appropriate SAPI, TEI, or control codes which are sent as part of the PRM LAPD protocol. Thus, a mask can be implemented such that if the proper SAPI, TEI or control codes are not sent, the message following those codes will be disregarded. FDL state machine 18 allows such masking. At block 59, the message counter is checked. If it is greater than two, then state machine 18 cycles to block 62 to write the scratch pad to memory, since if the mask is on, it will be appropriate to write the message to memory once all three control bytes have been received. If the counter is less than three, then block 60 is encountered.

At block 60, state machine 18 determines whether a LAPD mask bit is shown in memory location 01 of memory map 28 of FIG. 3. If this bit is not set then the mask is not on and the byte that has been received can be written to memory 20 at block 62. In such a case, the mask has not been used and the message, once completed, will be evaluated by processor 22. After the contents of the scratch pad have been written to memory at block 62, state machine 18 determines at block 63 whether the PRM message has been completed by evaluating the message counter. If the message has not been completed, then the state machine 18 cycles through to block 50. If the message has been. completed, then the processor 22 is interrupted at block 64. This interruption tells processor 22 that a PRM message associated with a particular FDL is now stored in memory and available for processing. At block 64, FDL state machine 18 also clears the PRM bit.

If at block 60 it is determined that the LAPD mask is on, then the particular byte presently in the scratch pad register will be compared with the preset mask values at block 64. Since the message counter keeps track of the number of bytes that have been received, state machine 18 can determine whether the appropriate SAPI, TEI or control byte has been sent, by comparing the contents of the scratch pad with the masks stored in either memory location OC, OD or OE as shown in memory map 28 of FIG. 3. As described above, the SAPI byte is the second byte received of a PRM message, following the flag. Thus, the message counter will indicate that the particular byte stored in the scratch pad is the SAPI byte when the message counter indicates two bytes have been received. Likewise, the message counter will indicate whether the current byte in the scratch pad is the TEI or control byte. If the byte in the scratch pad does not match the masks stored in the appropriate mask registers (either OC, OD or OE), then processor 22 will disregard the message and all further processing of the PRM message is aborted at block 66. FDL state machine 18 then cycles through to block 50. If the received SAPI, TEI or control byte corresponds with the mask byte stored in memory, then the byte stored in the scratch pad is written to memory at block 62.

Referring now to FIG. 4a, if at block 36 FDL state machine 18 determines that the BOM1 bit has been set, then state machine 18 cycles through to block 74. At block 74, the received bit is shifted into the scratch pad, and state machine 18 cycles through to block 76 wherein the bit counter indicated in the memory location 00 of memory map 28 of FIG. 3 is checked. FDL state machine 18 determines at block 76 whether the counter is equal to 7. If the counter is not equal to 7, then a full byte has not yet been received and FDL state machine 18 increments the bit counter at block 78 and cycles through to sample the next bit at block 50. If the counter is equal to 7, then a full byte has been received and the state machine 18 determines at block 80 whether the BOM2 bit has been set. If the BOM2 bit has been set, it indicates that this is not the first time the BOM message has been sent. As indicated earlier, command/response BOM messages are sent continuously for at least 10 times and priority BOMs are transmitted continuously until the alarm condition clears. Thus, the BOM2 bit is used in validating BOM messages. If the bit is not set, it indicates that this is the first BOM message received and state machine 18 will cycle through to block 82 wherein the BOM byte is written to the BOM message memory indicated in memory map 28 at location 08 in FIG. 3. After block 82, FDL state machine 18 cycles through to sample the next bit at block 50.

If the BOM2 bit has been set, indicating that a BOM message has already been received, then state machine 18 decides at block 84 whether the BOM byte now stored in the scratch pad is the same as that previously received and stored in the BOM message memory 08 of memory map 28 in FIG. 3. If these two bytes are equal, then the message counter is incremented at block 86. If then the message counter is equal to 7, as decided at block 88, then the same message has been received 8 times and is considered validated. Therefore, the state machine 18 cycles through to block 90 wherein an interrupt signal is sent to processor 22 to indicate that the BOM message stored in the BOM message memory is valid and available for analysis. Furthermore, the BOM and counter bits are reset at block 90 and the state machine 18 cycles through to sample the next bit at block 50. If the message counter is not equal to 7, then the BOM message has not been validated and state machine 18 cycles through to sample the next bit at block 50.

If at block 84 the byte in the scratch pad is not equal to the byte stored in the BOM memory then an error flag is checked at decision block 92. The error flag is in the first byte of memory map 28 in FIG. 3. If the flag has already been set, then the BOM message is considered invalidated and the message is aborted and the BOM and counter bits are cleared at block 94. After block 94, the state machine 18 cycles through to sample the next bit at block 50. If at decision block 92 it is determined that the error flag has not been set, then the error flag is set at block 96 and state machine 18 cycles through to sample the next bit at block 50.

Whenever in the flow diagram of FIG. 4 the state machine 18 cycles through to sample the next bit, it should be understood that the next bit to be sampled is associated with the next FDL and the flow diagram of FIG. 4 will be processed for that bit and its associated FDL, and will use the memory locations associated with that FDL.

It should be understood that the particular memory maps used in this description are for purposes of teaching the present invention, and are not intended to limit its scope. Other memory layouts may be used without departing from the present invention. Likewise, the flow diagram for FDL state machine 18 has been provided for purposes of illustrating one embodiment of the present invention. Other state machine flows can be implemented for ANSI T1.403, formatted FDLs or for other FDL formats without departing from the teachings of the present invention.

Although the present invention has been described in detail it should be understood the various changes, substitutions and alterations can be made without departing from the spirit and scope of the invention as defined solely by the appended claims.

What is claimed is:

1. A circuit for receiving and processing a plurality of facility datalinks from a telecommunications network, each of the facility datalinks having a plurality of bits, comprising:

at least one synchronizer operable to simultaneously receive and synchronize each bit of the plurality of facility datalinks, said synchronizer multiplexing each bit of each of the plurality of facility datalinks onto a single data stream, said synchronizer generating a data valid signal for each bit received and multiplexed;

a facility datalink state machine coupled to said synchronizer and operable to process each bit of the plurality of facility datalinks from said single data stream into specific memory formats in response to said data valid signal; and a first memory coupled to said state machine for storage of said specific memory formats of the plurality of facility datalinks.

2. The circuit of claim 1, and further comprising a processor coupled to said first memory, said processor operable to access said first memory in order to process said facility datalinks, said processor operable to generate processed information from said facility datalinks.

3. The circuit of claim 2, wherein said processor is further coupled to said state machine, said state machine operable to request said processor to access a particular facility datalink.

4. The circuit of claim 2, wherein said processor is operable to initiate responses to said facility datalinks based on the contents of said facility datalinks.

5. The circuit of claim 2, and further comprising:

a second memory coupled to said processor, said second memory operable to store said processed information; and a communications processor operable to access said second memory and respond to said processed information.

6. The circuit of claim 1, wherein said synchronizer is operable to transmit a data valid signal to said state machine, said data valid signal indicating that the particular facility datalink bit received by said state machine is valid.

7. The circuit of claim 1, wherein said state machine stores each of said facility datalinks in separate memory blocks within said first memory.

8. The circuit of claim 1, wherein each of said facility datalinks includes non-message bits and message bits, said state machine operable to identify said message bits based on said non-message bits.

9. The circuit of claim 8, wherein said state machine is further operable to validate messages received from each of said facility datalinks.

10. The circuit of claim 8, wherein said state machine is further operable to compare said non-message bits with predetermined mask patterns and store said message bits only in response to matches between said mask patterns and said non-message bits.

11. A method of receiving and processing a plurality of facility datalinks from a telecommunications network, each of the facility datalinks having a plurality of bits, comprising the steps of:

simultaneously receiving the plurality of facility datalinks from the telecommunications network;

synchronizing each bit of each of the plurality of facility datalinks;

multiplexing each bit of the plurality of facility datalinks onto a single data stream;

generating a valid signal for each bit;

processing the single data stream into specific memory formats in response to said valid signal; and separately storing each of the specific memory formats of the plurality of facility datalinks.

12. The method of claim 11, and further comprising the steps of:

retrieving the separately stored plurality of facility datalinks; and generating processed information from the plurality of facility datalinks.

13. The method of claim 12, and further comprising the step of retrieving a particular facility datalink.

14. The method of claim 12, and further comprising the step of initiating responses to the facility datalinks based on the contents of the retrieved facility datalinks.

15. The method of claim 12, and further comprising the steps of:

storing the processed information;

accessing the stored processed information; and responding to the processed information.

16. The method of claim 11, wherein each of the facility datalinks includes non-message bits and message bits, and further comprising the step of identifying the message bits based on the non-message bits.

17. The method of claim 16, and further comprising the step of validating messages received from each of the facility datalinks.

18. The method of claim 16, and further comprising the steps of:

comparing the non-message bits with predetermined mask patterns; and storing the message bits only in response to matches between the mask patterns and the non-message bits.

* * * * *